Dec. 20, 1960
W. J. HIRTREITER
2,965,824
CYCLIC MOTOR
Filed June 17, 1958
5 Sheets-Sheet 1
Fig. 1.
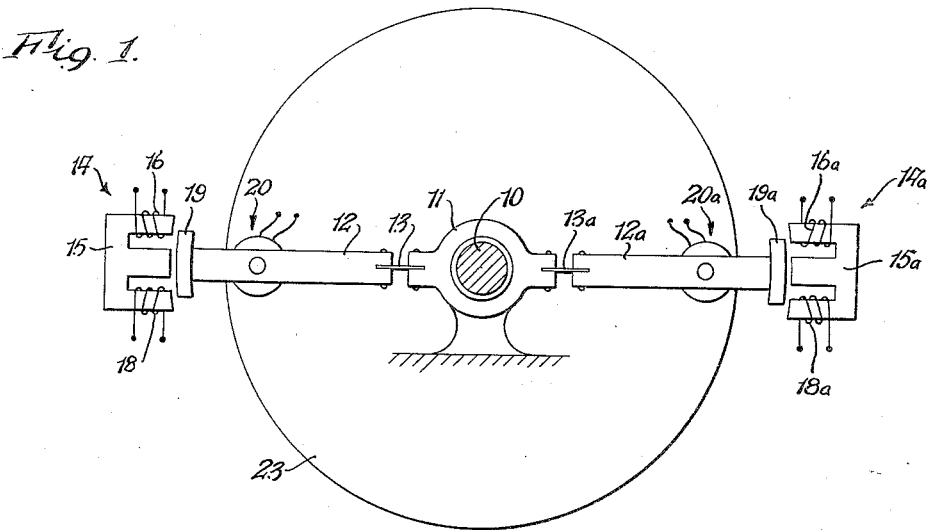
Fig. 2.
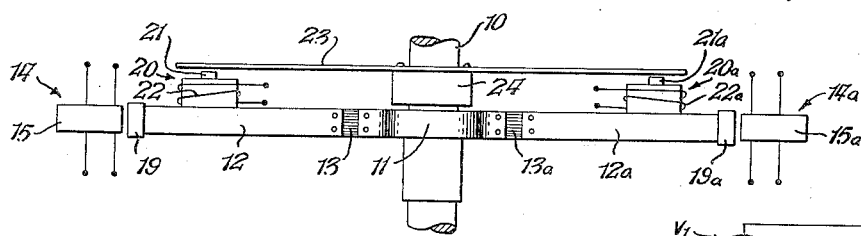
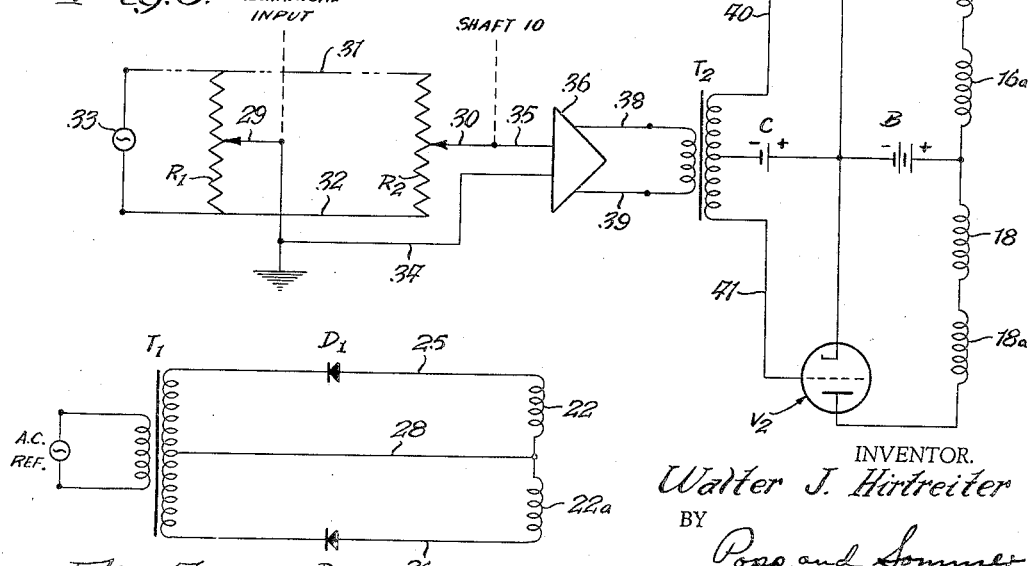
Fig. 3.
Fig. 4.
INVENTOR.
Walter J. Hirtreiter
BY
Popp and Sommer
Attorneys.

Dec. 20, 1960     W. J. HIRTREITER     2,965,824
CYCLIC MOTOR

Filed June 17, 1958                                                                  5 Sheets-Sheet 2

ANGLE OF OSCILLATION, CLUTCH 1.

ANGLE OF OSCILLATION, CLUTCH 2.

CLUTCHING SEQUENCE

OUTPUT VELOCITY, UNFILTERED

OUTPUT VELOCITY, FILTERED BY INERTIA

|← ONE CYCLE →|

OPERATION CYCLES OF MOTOR

INVENTOR.
*Walter J. Hirtreiter*
BY
*Popp and Sommer*
*Attorneys.*

Dec. 20, 1960 W. J. HIRTREITER 2,965,824
CYCLIC MOTOR
Filed June 17, 1958 5 Sheets-Sheet 3

INVENTOR.
Walter J. Hirtreiter
BY
Popp and Sommer
Attorneys.

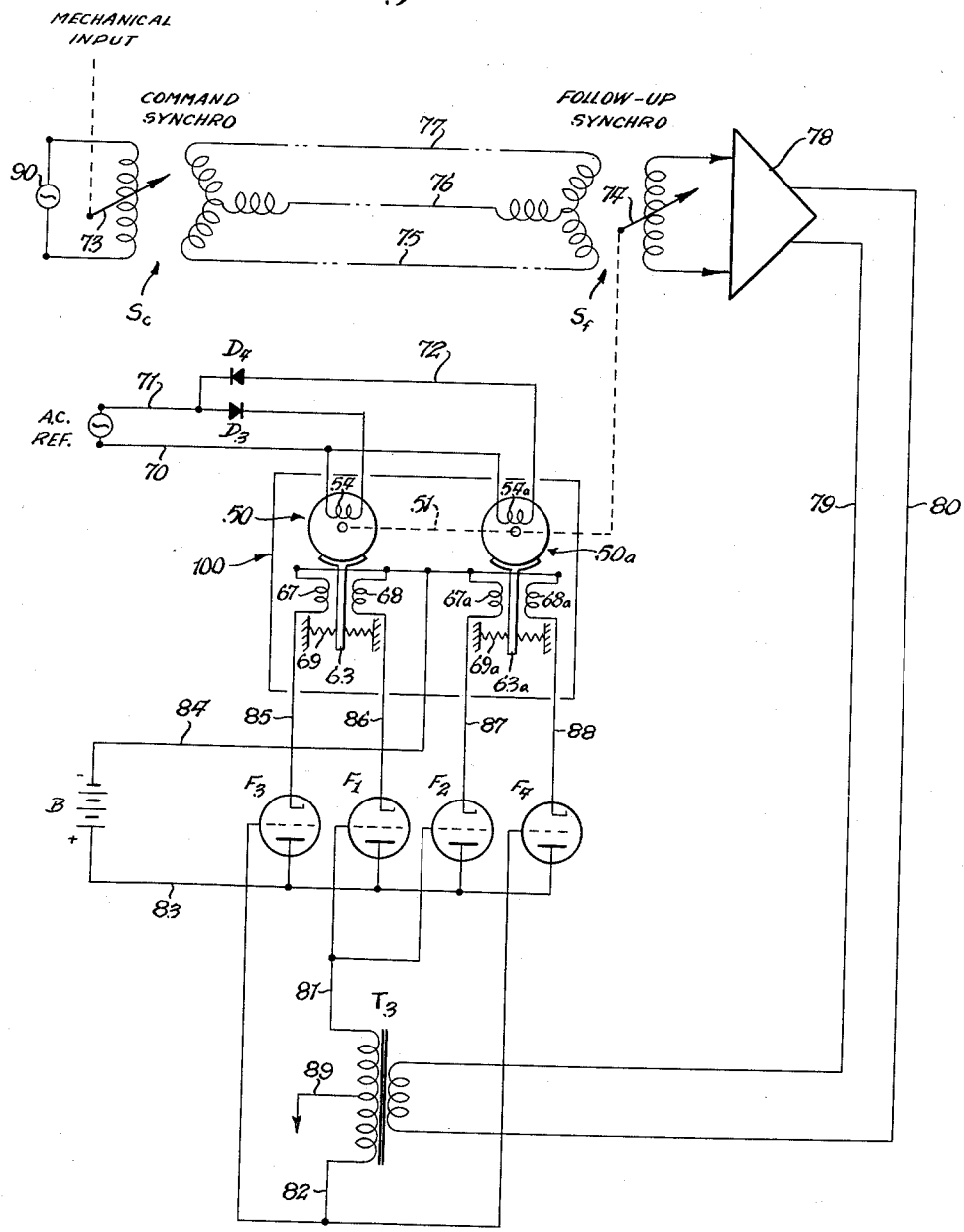

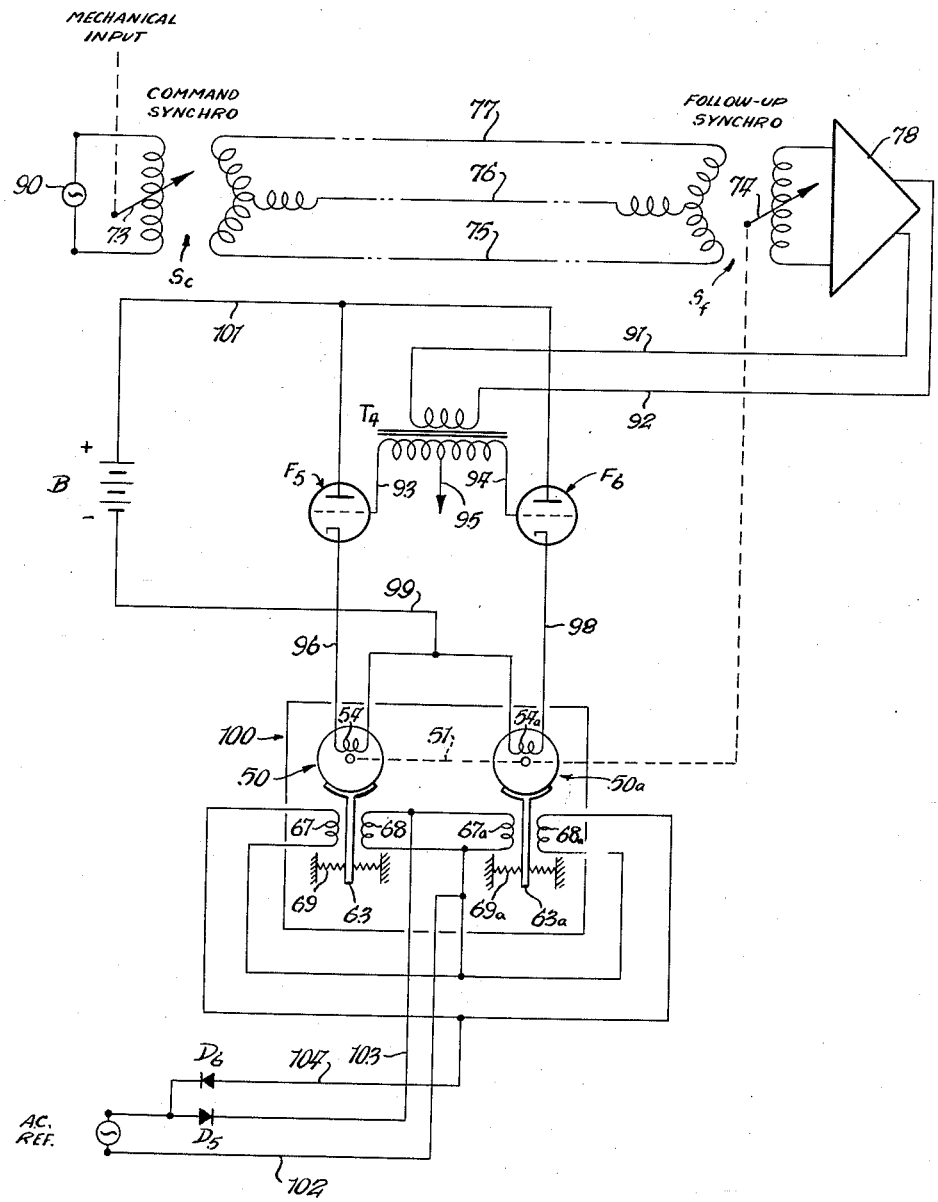

United States Patent Office 2,965,824
Patented Dec. 20, 1960

2,965,824
CYCLIC MOTOR
Walter J. Hirtreiter, Buffalo, N.Y., assignor to Cornell Aeronautical Laboratory, Inc., Buffalo, N.Y., a corporation of New York
Filed June 17, 1958, Ser. No. 742,529
9 Claims. (Cl. 318—37)

This invention relates to a cyclic motor, and more particularly to one employing electrically-driven oscillating and clutching elements which cooperate in the motor to convert oscillatory motion into rotary motion and having characteristics which render it well suited for application in precision positioning systems such as are used in stabilized platforms, pen recorders, chart drives, servo-indicators, computing servomechanisms, machine tool controls and many others.

One of the objects of the invention is to provide such a cyclic motor which has a high torque-to-inertia ratio characteristic so that its response is practically instantaneous. The motor shaft will accelerate from zero speed to full speed within one cycle of the power frequency when an electrical "step" input is applied, and when this input is removed the shaft comes to a stop in about the same period of time.

Another object is to provide such a cyclic motor in which the speed of its output shaft can be essentially proportional to one of its input voltages. Because of this feature and because of its high torque-to-inertia ratio, this cyclic motor may be easily incorporated into a closed-loop positioning servo system having high resolution or positioning accuracy and inherent stability, without the use of tachometric or other error-derivative stabilizing means.

Another object is to provide such a cyclic motor which can provide high torque output at a relatively low shaft speed. When used in a system, it can be directly coupled, without the use of mechanical gearing, to such loads as single or multiple-ganged potentiometers, synchros, resolvers, switches, cams, mirrors, mechanical linkages, etc. as required. Unlike conventional servo systems which employ high speed induction-type servo motors and gear reductions to multiply available torque and reduce shaft speeds, the cyclic motor embodying the principles of the present invention provides this operating condition directly within its mode of operation. Thus, in a precision positioning system using this cyclic motor, expensive gearing can be eliminated. Also, since there is no gearing in this cyclic motor, backlash in the output shaft is non-existent. When the motor is used in a closed-loop positioning servo system, repeatable angular positioning of the output shaft to an accuracy measured in seconds (unit of angular measure) is possible.

A further object is to provide such a cyclic motor in which its output shaft can provide a variable torque with substantially constant speed.

Other objects and advantages of the invention will be apparent from the following detailed description of several embodiments thereof and the accompanying drawings in which:

Fig. 1 is an end view of one form of cyclic motor embodying the principles of the present invention.

Fig. 2 is a top plan view thereof.

Fig. 3 is a circuit diagram showing a typical system by which the oscillatory windings of the cyclic motor as shown in Fig. 1 may be subjected to a variable excitation input.

Fig. 4 is a circuit diagram showing a typical way in which the clutch windings of the cyclic motor shown in Fig. 1 may be subjected to a fixed excitation input.

Figure 5:
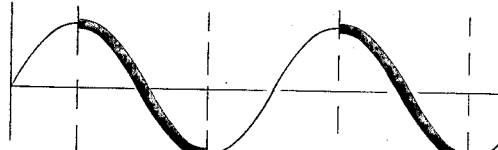
Figure 6:
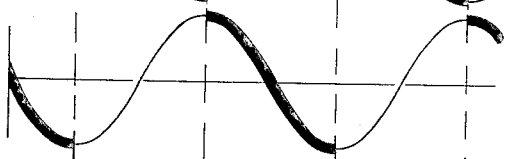
Figure 7:
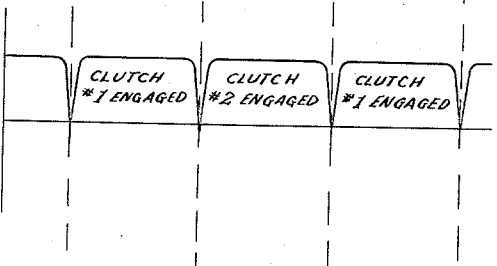
Figure 8:
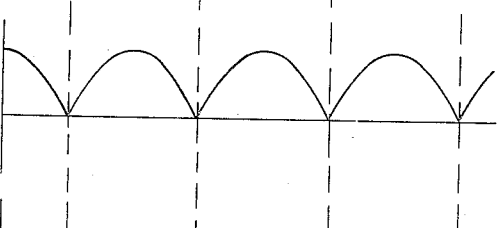
Figure 9:
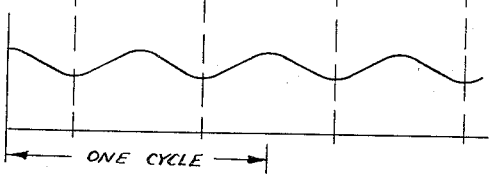

Figs. 5–9 are diagrams depicting various related aspects of the operating cycles of the cyclic motor embodying the principles of the present invention, Fig. 5 depicting the angle of oscillation of the first clutch, Fig. 6 depicting the angle of oscillation of the second clutch, Fig. 7 depicting the clutching sequence, Fig. 8 depicting the output velocity unfiltered, and Fig. 9 depicting the output velocity filtered by inertia.

Figure 10:
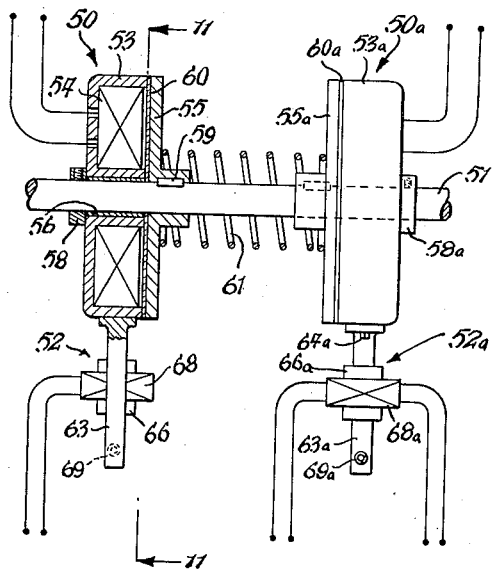

Fig. 10 is a side view, partly in section, of a modified form of cyclic motor embodying the principles of the present invention.

Figure 11:
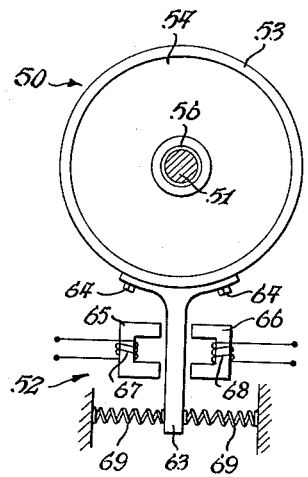

Fig. 11 is a vertical transverse sectional view thereof taken on line 11—11, Fig. 10.

Fig. 12 is a diagram illustrating the cyclic motor of Fig. 10 schematically in association with a typical electrical circuit so arranged that the clutch windings of the motor have a fixed excitation input and the oscillatory windings of the motor have a variable excitation input.

Fig. 13 is a similar diagram but showing the clutch windings arranged for a variable excitation input and the oscillatory windings for a fixed excitation input.

Referring to the form of the invention illustrated in Figs. 1 and 2, the numeral 10 represents a horizontal shaft to be driven, such shaft being shown as journalled in a suitable fixed bearing 11. On diametrically opposite sides of the shaft 10 are arranged oscillatable drive members 12 and 12a, each being shown in the form of a bar extending radially outwardly from the longitudinal axis of the shaft 10. Each of the drive members 12, 12a is arranged for oscillation in a direction circumferential to such axis. In order to permit and oppose yieldingly such oscillation, the inner end of the drive member 12 is shown as connected to the fixed bearing 11 by a leaf spring 13 and a similar leaf spring 13a connects the inner end of the other drive member 12a to the bearing 11. Each leaf spring is suitably connected at its ends to the respective drive member and bearing. As shown, the inner ends of the drive members are bifurcated to receive the outer ends of the leaf springs and the bearing is formed with outwardly projecting bifurcated lugs to receive the inner ends of these springs.

Means are provided for oscillating each drive member. For the drive member 12, such means are indicated generally at 14 and comprise electromagnetic means including an E-shaped core 15 and a so-called oscillatory winding composed of two separate windings 16 and 18. The upper separate winding 16 is shown coiled around the upper horizontal arm of the core 15 and the other separate winding 18 is coiled around the lower horizontal arm of this core. A magnetically permeable member 19 is shown as arranged on the outer end of the drive member 12 in spaced but proximate relation to the core 15, such member 19 serving as an armature and being movably responsive to the magnetomotive force of the electromagnet 14. The separate windings 16 and 17 which jointly form one oscillatory winding of the motor are so wound upon the core 15 that when they are alternately excited the drive member 12 is caused to oscillate in a circumferential direction with respect to the axis of the driven shaft 10, such oscillation being yieldingly opposed by the leaf spring element 13. In this connection, as used herein, the term "oscillatory winding" means a winding which does not oscillate itself but which produces oscillatory motion in other members, such as the drive members 12, 12a.

Similar electromagnetic means 14a having a core 15a, windings 16a and 18a and armature 19a, are provided for the other drive member 12a and are operative to oscillate this drive member in the same manner just described for the drive member 12.

Electromagnetic clutch means are operatively interposed between each drive member 12 or 12a and the driven member or output shaft 10. For the drive member 12, such means are shown as including an electromagnet indicated generally at 20 and having a core or body 21 and clutch winding 22. Such electromagnet 20 is shown as being mounted on the drive member 12 intermediate the ends thereof so as to move therewith. A similar electromagnet 20a having a core 21a and clutch winding 22a, is shown as similarly mounted on the drive member 12a. Disposed opposite the electromagnets 20, 20a and in operative position with respect thereto so as to be subject to the magnetomotive force of each thereof, is a clutch plate 23. Such clutch plate 23 is shown as being in the form of a magnetically permeable annular member or disc closely spaced to the electromagnetic cores 21, 21a and fast in any suitable manner to the driven member or output shaft 10. As shown, the clutch plate 23 is suitably fastened to a shaft collar 24 in turn suitably non-rotatively secured to the shaft 10.

It is preferred, as shown in all embodiments illustrated and described herein, to provide at least two instrumentalities for driving the shaft 10 in order to increase the efficiency of the cyclic motor. However, it is to be understood that the principles of the invention can be embodied in a cyclic motor in which there is only one driving instrumentality, such as the drive member 12, oscillating means 14 and electromagnetic clutch 20. As well, there could be several pairs of driving instrumentalities disposed at circumferential intervals about the clutch plate 23.

The fundamental operation of the cyclic motor can best be understood by considering only one drive instrumentality. For example, when direct current is applied to the clutch coil 22, the clutch plate 23 is locked magnetically to the clutch body 21 of the electromagnetic clutch 20, and likewise released when the current is interrupted. The configuration is such that when the separate windings 16 and 18 of the oscillatory winding of the oscillating means 14 are alternately excited cyclically as with an alternating current, an alternating magnetic field force is applied to the armature 19 causing it and the drive member 12 connected thereto to oscillate. Since the drive member 12, which is constrained to permit rotary motion only, carries the clutch body 21 a slight angular oscillatory motion is imparted to the clutch body whenever the member 12 oscillates. If the clutch is energized with a direct current, the clutch plate 23 and shaft 10 will then oscillate in angular motion along with the clutch body. However, if the clutch is excited with pulsing current so phased that the clutch mechanism engages at the peak position of the oscillating motion, and remains engaged only until the peak position in the opposite direction is reached (engaged for one-half cycle, 90 degree phase), and then disengages during the next half cycle of motion, the ratcheting action thus created causes the output shaft 10 to rotate a bit each time this cyclic operation is repeated. A rotation of the output shaft 10 is thus derived from a series of small "steps," and its direction is, of course, dependent upon which half cycle of the oscillatory motion is continuously selected during the clutch engagement.

In this simplified consideration of the motor, force for rotating the shaft, is supplied only during one-half cycle of the input power, and the efficiency of the device is consequently low. In order to overcome this, two oscillating clutches 20, 20a are provided for the single output shaft, as shown. The magnetic circuits which oscillate these clutches are connected so that when excited, their motions are 180 degrees out of phase with each other. The clutch coils 22, 22a are alternately pulsed at the correct instant and at the same frequency as the oscillation frequency so that power or turning force is applied to the output shaft essentially continuously during the whole cycle of the input power applied to the motor.

The diagram shown in Figs. 5–9 illustrate the operating cycle of the motor having two clutches. Referring to Figs. 5 and 6, the oscillatory motion is depicted as being sinusoidal and the clutch action as being on-off in operation. Since the clutches are spring-restrained, sinusoidal oscillatory motion is easily obtained by driving the electromagnets 14, 14a with sinusoidally varying current. The on-off action of the clutches may be obtained by applying to them half-wave pulses, produced typically in a manner hereinafter described, whose amplitude is sufficient to drive the magnetic circuit into saturation. Theoretically, under these conditions and if the clutch action is exactly 90 degrees out of phase with the oscillatory motion, the clutch engages with the output shaft at the peak position when the oscillating member has zero velocity and there is no internal slippage at the clutches in the motor. The output velocity will then vary as depicted in Fig. 8. However, since the output member possesses inertia, though relatively small, some filtering action is obtained and the actual output velocity will appear more as depicted in Fig. 9. The inertia of the external load will, of course, cause additional filtering.

The cyclic motor of the present invention has two sets of windings for each driving instrumentality and which must be energized to operate the motor. One winding designated the oscillatory winding is composed of the two separate windings 16 and 18, or 16a and 18a, while the other winding designated the clutch winding is shown at 22, or 22a, respectively. Either one of these windings may be excited by a fixed current supplied by the power line, and the other may be excited by a varying power coming from a control amplifier.

If the oscillatory winding is fixed-excited and the clutch winding is made variable, the output speed of the motor will tend to remain constant due to the constant amplitude of the oscillating clutches and the maximum torque output, deliverable to an external load before slipping at the clutches occurs, will vary with the strength of the clutch currents.

On the other hand, if the clutch currents are held fixed, and the currents to the oscillatory windings are allowed to vary, the maximum torque output of the motor, before slipping occurs, will tend to remain constant and the speed will vary in correspondence to the variation in the amplitude of the oscillating clutches.

In other words, two modes of operating this cyclic motor are possible, one which allows control of the output torque and the other which allows control of the output speed. The best mode for a given application may depend upon the inertia and/or friction characteristics of the load.

In Figs. 3 and 4, the various windings 16, 16a, 18, 18a, 22 and 22a are shown as arranged in an illustrative circuit which will operate to subject the clutch coils to a fixed excitation input and the oscillatory windings to a variable excitation input.

Considering first Fig. 4, an A.C. reference signal is put into the primary of a transformer $T_1$. The ends of the secondary thereof are connected severally to one end of each of the clutch windings 22, 22a by lines 25 and 26, and rectifiers $D_1$ and $D_2$ which may be of any suitable type such as diodes are arranged in the lines 25 and 26, respectively. Both rectifiers $D_1$ and $D_2$ are shown as arranged to pass current only in a direction toward the transformer $T_1$. These diodes may pass current in the opposite direction if both are reversed. In the motors' operation it makes no difference which way they are connected as long as both are faced the same way. The other ends of the clutch windings 22 and 22a are connected together and by a central line 28 are returned to a center tap on the transformer secondary. It will be observed that with this arrangement the clutch windings 22, 22a will be alternately and cyclically energized by a fixed excitation input of one-half cycle duration to provide an on-off operation of each clutch and an alternate clutching action as depicted in Fig. 7. By fixed excitation input is meant that the half cycle pulse excitation remains fixed.

Considering now Fig. 3, $R_1$ represents a potentiometer having a movable contact 29 driven by some mechanical input such as displacement information and $R_2$ represents a follow-up potentiometer having a movable contact 30 driven by the cyclic motor output shaft 10. The ends of the potentiometers $R_1$ and $R_2$ are shown as connected to two lines 31, 32 across which an A.C. signal input 33 is applied. This A.C. signal 33 has the same frequency as the A.C. reference signal input for the transformer $T_1$. The movable contacts 29, 30 are shown as connected by input lines 34, 35, respectively, to an amplifier 36 of any suitable form. The line 34 is shown as grounded. Output lines 38, 39 from the amplifier 36 are shown as connected to the primary of a second transformer $T_2$. The secondary of this transformer $T_2$ is shown as connected by the grid lines 40, 41 to the grids of triodes $V_1$, $V_2$, respectively. The plates of these triodes are connected in series with the windings 16, 16a, 18, 18a in the order named. A B battery connects the line between the windings 16a and 18 with the cathode line and a C battery connects the cathode line with a center tap on the secondary of the transformer $T_2$.

The plate currents of the vacuum tubes $V_1$ and $V_2$ supply the necessary quiescent or D.C. polarizing currents in the windings 16, 16a, 18 and 18a so as to create a reference magnetic field bias which then is varied by any alternating current signal applied to the grids of these tubes. The arrangement shown in Fig. 3 is such that the alternating currents in the corresponding pairs of coils 16, 18 and 16a, 18a are applied 180 degrees out of phase so that during one half cycle, the field caused by, say, coil 16, is strengthened, and the field caused by the other coil 18, is weakened causing the armature 19 (Fig. 1) to move toward the pole of coil 16. During the next half cycle the polarity relationships and forces of the coils 16 and 18 reverse, causing the armature 19 to swing toward the other pole which contains winding 18.

Due to time constants in all the magnetic windings of the motor, the A.C. reference voltage and the amplified signal voltage are suitably phased to produce the clutching action 90 degrees out of phase with the oscillating motion. The proper signal delay to produce this phase shift may be somewhat less than 90 degrees, dependent upon the actual delay in the magnetic elements.

From the foregoing it will be seen that as mechanical input shifts the movable contact of the potentiometer $R_1$, a signal input to the amplifier 36 results whose magnitude depends upon the lack of correspondence of the movable contacts 29 and 30. The amplifier output controls the voltage on the grids of the triodes $V_1$, $V_2$ and thus the plate currents. The windings 16, 16a are responsive to the plate current of the triode $V_1$ while the windings 18, 18a are responsive to the plate current of the triode $V_2$. Since at any given instant one end of the secondary of the transformer $T_2$ is charged positive, and the other end negative, the corresponding grids are similarly charged, thus controlling current flow in the corresponding two plate circuits. Instead of the transformer $T_2$ to provide push-pull operation, an electronic phase inverter might be employed.

In short, the windings 16, 16a are supplied with a sinusoidally increasing current while the windings 18, 18a are supplied with a sinusoidally decreasing current, and vice versa. Inasmuch as the windings 16, 18 form the oscillatory winding of one drive instrumentality, and the windings 16a, 18a the oscillatory winding of the other, it will be seen that the drive members 12, 12a are caused to be oscillated sinusoidally. Keeping in mind that the A.C. reference signal and the A.C. signal 33 are operatively 90 degrees out of phase from each other, the clutches 20, 20a will be rendered operative or inoperative at the peak amplitude positions of the drive members 12, 12a. For example, assume winding 16 receives an increased current while its companion winding 18 receives a decreased current. The drive member 12 is caused to move clockwise as viewed in Fig. 1. When at its peak upper position the clutch 20 is engaged by energizing its winding 22 thereby locking the shaft 10 to the drive member 12. At the same time the winding 16a receives an increased current and the winding 18a receives a decreased current, resulting in moving the drive member 12a counterclockwise, as viewed in Fig. 1, to a peak upper position at which the clutch 20a is disengaged by deenergizing its winding 22a. Thus at this moment both drive members are in their upper positions. During the ensuing one-half cycle, during which the clutch 20 is energized and the clutch 20a deenergized, the drive member 12 drives the shaft 10 in a counter-clockwise direction while the drive member 12a whose clutch 20a is deenergized moves in a clockwise direction. Thus an increment of counterclockwise movement has been imparted to the shaft 10. When this half-cycle ends, the clutch 20 is disengaged at the lower peak position of the drive member 12 and the clutch 20a is engaged also at the lower peak position of the drive member 12a. During the next half-cycle, the drive members reverse their previously described directions of movement, the drive member 12a moving counterclockwise while driving the shaft 10 in the same direction, and the drive member 12 moves upwardly in a clockwise direction. Thus, the drive member 12a gives the shaft 10 another increment of movement in a counterclockwise direction. It will be seen that the effective motions of the driving instrumentalities are 180 degrees out of phase from each other.

Since the driven shaft 10 drives the movable contact 30, the latter will be moved toward a position of correspondence with the contact 29 at which time no signal input to the amplifier 36 results and no oscillation of the drive members 12, 12a takes place. It will also be observed that the amplitude of oscillation of the drive members 12, 12a decreases as shaft induced displacement of the movable contact 30 follows-up the displacement of the movable contact 29 until a position of correspondence occurs at which time the oscillation of drive members 12, 12a ceases.

With such an arrangement, therefore, the clutch coils 22, 22a are fixedly excited and the oscillatory windings 16, 18 and 16a, 18a are variably excited, the speed of the output shaft 10 being proportional to the error within the limits of maximum available speed.

Referring to Fig. 3, it will be further understood that the potentiometers $R_1$, $R_2$ form a balanced bridge circuit from which the error signal fed to the amplifier 36 will be of such magnitude and direction or phase so as to cause shaft 10 to be driven in the proper direction, clockwise or counterclockwise.

The modified form of cyclic motor embodying the principles of the present invention shown in Figs. 10 and 11 comprises a pair of similar clutch assemblies 50, 50a having parts rotatably mounted on a driven shaft 51 arranged horizontally and severally oscillated by means indicated generally at 52, 52a, respectively. The clutch 50 comprises a body 53, clutch coil or winding 54, and clutch plate 55. The clutch body 53 is shown as being in the form of an annular channeled member in the groove or channel of which the coil 54 is arranged. The bore of the clutch body 53 is fitted with a sleeve bushing 56 which surrounds a portion of the motor output shaft 51. A collar 58 fast to the shaft 51 bears against one side of the clutch body 53. The clutch plate 55 is made of magnetically permeable material and is disposed on the opposite side of the clutch body and has an integral hub which is suitably non-rotatably connected to the shaft 51, as by the key 59. In order to provide reluctance a thin shim 60 of non-magnetic material is preferably contactably interposed between the opposing faces of the clutch body 53 and clutch plate 55.

The clutch 50a has a construction similar to that described for the clutch 50 and corresponding parts are therefore designated by the same reference numerals except distinguished by the suffix a. The clutch 50a is shown as arranged on the shaft 51 in reverse relation to the clutch 50. Between the opposing clutch plates 55, 55a and surrounding the shaft 51 is a helical compression spring 61 which urges the clutch plates toward their respective clutch bodies.

The oscillating means 52 and 52a are similar in construction. The construction of the means 52 will be described in detail and it will be understood that similar reference characters, except as distinguished by the suffix a, will be employed to designate corresponding parts in the oscillating mechanism 52a. The clutch body 50 is shown as having a magnetically permeable arm 63 extending radially outwardly therefrom. At its inner end, this arm which is in the form of a bar, has circumferentially extending flanges on opposite sides of its medial portion to permit of attachment as by screws 64 to the exterior of the clutch body 50. A pair of electromagnets comprising C-shaped cores 65, 66 and separate windings 67, 68, respectively, are arranged in spaced relation on opposite sides of the outwardly extending arm 63. Springs 69, 69 are arranged on opposite sides of the arm 63 at the outer extremity thereof, these springs being arranged to oppose yieldingly oscillation of the arm 63 in the gap provided between the polar arms of the cores 65, 66 about which the windings 67, 68 are wrapped.

Inasmuch as the clutch bodies 53, 53a are freely rotatably mounted on the output shaft 51 whereas the clutch plates 55, 55a are fast to this shaft, it will be seen that if the clutch body is oscillated and the clutch windings 54, 54a are energized cyclically and in a predetermined relationship to the oscillation of the clutch body, the clutches will be operative to alternately drive the output shaft 51 to give the sequence of operation depicted in Figs. 5–9.

The form of cyclic motor shown in Fig. 10 is illustrated schematically within the limits of the box designated 100 in the circuit diagram of Fig. 12. This circuit diagram is illustrative of a servo system arranged to subject the clutch windings 54, 54a to a fixed excitation input and the corresponding pairs of separate windings 67, 68 and 67a, 68a, each of which pairs forms jointly an oscillatory winding, are subject to a variable excitation input.

To this end, a line 70 connects one end of each of the clutch windings 54, 54a to one side of an A.C. reference signal input. A line 71 is shown as connecting the other side of the A.C. reference signal to the other end of the clutch coil 54. The line 71 has a diode $D_3$ arranged therein. The corresponding other end of the clutch coil 54a is connected by a branch line 72 to the line 71 on the input side of the diode $D_3$. The branch line 72 has a diode $D_4$ arranged therein. The diodes $D_3$, $D_4$ are arranged so as to alternately pass an energizing current through the corresponding clutch windings, 54, 54a. Any other suitable means for rectifying the alternating current in the lines 71, 72 may be employed.

The servo system is also shown as including a command synchro $S_c$ and a follow-up synchro $S_f$. These synchros have a movable element 73 and 74, respectively. An A.C. signal 90 is applied to the movable element 73 of the command synchro and this signal has the same frequency as the A.C. reference signal across the line 70, 71. The movable element 73 of the command synchro and this signal has the same frequency as the A.C. reference signal across the line 70, 71. The movable element 73 of the command synchro is subject to change in position by a mechanical input in the nature of displacement information. The stator windings of the command and follow-up synchros are connected together in the manner shown by the lines 75, 76 and 77. The movable element 74 of the follow-up synchro is driven by the output shaft 51 of the cyclic motor 100. The construction and operation of command and follow-up synchros is well understood by those skilled in the art.

When the movable element or winding 73 of the command synchro is changed in position relative to the stator windings, an error signal is generated in the movable element 74 of the follow-up synchro which in turn is applied to the amplifier 78. By lines 79, 80, the amplified output signal of the amplifier 78 is connected to the end of the primary of a transformer $T_3$. One end of the secondary of the transformer $T_3$ is shown as connected by a line 81 to the grids of two cathode followers $F_1$, $F_2$. The other end of the secondary of the transformer $T_3$ is connected by a line 82 to the grids of another pair of cathode followers $F_3$, $F_4$. All the plates of the cathode followers $F_1$, $F_2$, $F_3$ and $F_4$ are connected jointly by a line 83 to the positive side of a B battery, the negative side of which battery is connected by the line 84 to one corresponding end of each of the windings 67, 68, 67a, 68a. The other ends of these windings 67, 68, 67a, 68a are connected by the respective lines 85, 86, 87, 88 to the corresponding cathodes of the followers $F_3$, $F_1$, $F_2$, $F_4$, respectively. The grids of the cathode followers have a return to ground shown at 89 which is connected to the center of the secondary winding of the transformer $T_3$.

The amplifier 78 is adjusted to properly phase the oscillation of the arms 63, 63a to the clutching action of the clutches 50, 50a. Such phase displacement is preferably 90 degrees in order to provide the sequence of operation depicted in Figs. 5–9.

From the foregoing it will be seen that the clutch windings 54, 54a are alternately energized and deenergized during one-half cycle of the A.C. reference signal. Assuming a mechanical input shifts the position of the movable element 73 of the command synchro, this causes an error signal to be fed to the amplifier 78 whose output energizes the transformer $T_3$. At any instant, one end of the secondary of this transformer will be positive while the opposite end is negatively charged. For example, assume that the grids of the followers $F_1$, $F_2$ are positively charged. This causes the current to flow through these triodes, in turn energizing the windings 68, 67a. At the same time, the other end of the secondary of the transformer $T_3$ will be negatively charged so that the grids of the followers $F_3$, $F_4$ are negatively charged preventing the flow of current through these triodes. This keeps the windings 67, 68a from being energized.

In viewing Fig. 12, when the windings 68, 67a are energized, the clutch arm 63 will be attracted to move in a counterclockwise direction while the clutch arm 63a will be caused to move in a clockwise direction. At their respective peak positions of amplitude of these arms, if the clutch coil 54 is energized and the other clutch coil 54a is deenergized, during the next half cycle of operation the clutch 50 will become engaged so as to drive the output shaft 51 in a clockwise direction. During the ensuing one-half cycle the clutching action is reversed so that now the clutch 50a is operative while the clutch 50 is inoperative and the clutch 50a is likewise driving the output shaft 51 in a clockwise direction.

It will be understood that the error signal fed to the amplifier 78 will be of such magnitude and direction or phase as to cause the output shaft 51 to be driven in the proper direction, whether clockwise or counterclockwise, in order to restore the movable element 74 of the follow-up synchro to a position corresponding to that for the movable element 73 of the command synchro.

The circuit shown in Fig. 12 is an example of how the cyclic motor 100 may be used in a typical closed-loop positioning servo system in which the clutch and oscillatory windings of the driving instrumentalities are subjected to fixed and variable excitation inputs, respectively, whereby the maximum available speed of the output shaft 51 for moving the movable element 54 is proportional to the error commanded by the input syncro.

Fig. 13 shows a modified servo circuit embodying the cyclic motor 100 and which is similar to that shown in Fig. 12 with the exception that in Fig. 13 the oscillatory windings are subject to a fixed excitation input and the clutch wndings are subject to a varable excitation input, whereby the maximum available torque for moving the movable element 54 is proportional to the error commanded by the input synchro.

Referring to Fig. 13, the means arranged to provide cyclically variable excitation current input for the clutch windings 54, 54a are shown as comprising a transformer $T_4$ and a pair of cathode followers $F_5$ and $F_6$. The primary of the transformer $T_4$ receives the amplified output error signal from the amplifier 78 through the lines 91 and 92 connected severally to the ends of the transformer primary. The secondary of this transformer $T_4$ is shown connected at its ends severally with the grids of the cathode followers $F_5$, $F_6$ by the lines 93, 94, respectively. The center of the secondary winding of the transformer $T_4$ has a tap 95 to ground whereby the grids of the cathode followers $F_5$, $F_6$ are returned to ground. The cathode of the triode $F_5$ is connected by the line 96 to one end of the clutch winding 54. A line 98 connects the cathode of the other triode $F_6$ to the other end of the other clutch winding 54a. The opposite ends of the clutch windings 54, 54a are shown as connected by a line 99 to the negative side of a B battery, the positive side of which is connected by a line 101 to the plates of the triodes $F_5$, $F_6$.

The means arranged to provide cyclically fixed excitation current input for the oscillatory windings of the clutches 50, 50a, are shown as comprising a line 102 connecting one side of the A.C. reference signal to the lower ends of each of the windings 67, 68, 67a, 68a, as shown in Fig. 13. The upper ends of the windings 68, 67a are shown as connected by a line 103 to the other side of the A.C. reference signal input. This line 103 has a rectifier of any suitable type such as a diode $D_5$ arranged therein, this diode being operative to permit current to flow only toward the upper ends of the windings 68, 67a. The upper ends of the windings 67, 68a, are shown as connected by a branch line 104 to the line 103, such connection with the line 103 being on the input side of the diode $D_5$ therein. The line 104 has therein a suitable rectifier such as a diode $D_6$ arranged to pass current in a direction only away from the upper ends of the windings 67, 68a.

As in the case of the circuit shown in Fig. 12, the A.C. reference signal and A.C. signal 90 in Fig. 13 have the same frequency. Because the windings 67, 68 forming jointly the oscillatory winding of the clutch 50, and the similar windings 67a, 68a forming jointly the oscillatory winding of the other clutch 50a, are subjected to a fixed excitation input in such manner that the separate windings of each oscillatory winding are alternately excited and the oscillatory windings of the two clutches are 180 degrees out of phase, it will be seen that the arms 63, 63a are caused to be oscillated with a constant amplitude. Any error signal fed by the amplifier 78 into the transformer $T_4$ causes the clutch windings 54, 54a to be alternately excited with a signal which is about 90 degrees out of phase with the A.C. reference signal whereby the effective driving torque of the clutches 50, 50a transmitted to the driven output shaft 51 is proportional to the error signal.

Whether the cyclic motor 100 is employed as in the circuit of Fig. 12 to provide fixed maximum torque with variable speed, or is employed as in the circuit of Fig. 13 to provide variable torque with fixed maximum speed, will depend upon the application desired. It is believed clear that the cyclic motor embodying the principles of the present invention is not necessarily limited in application to a servo system, the various circuits illustrated merely exemplifying practical uses. Besides the potentiometers shown in the circuit of Fig. 3 or the synchros shown in the circuits of Figs. 12 and 13, any other suitable transducer such as a differential transformer, variable capacitor, or any combination of such transducers, may be employed in a circuit to produce cyclically a variable excitation input for one of the windings of the cyclic motor. As well, other devices than the cathode followers specifically illustrated and described might be employed to perform an equivalent function.

Further, the cyclic motor can be designed to employ permanent magnets in both the oscillating and clutching circuits to provide a magnetic field bias. When this is done, diodes are not reqiured in the A.C. reference signal circuit since a winding may be used to superimpose a magnetic effect negating or reinforcing that of the permanent magnet, nor are the D.C. polarizing or tube quiescent currents required.

The cyclic motor can be designed for operation at power frequencies considerably above or below 60 cycles. Designs for operation and frequencies up to and somewhat beyond 400 cycles per second are perfectly feasible. There is no inherent low frequency limit. In any case, the proper phase relation between the two inputs to the motor must be maintained.

A cyclic motor in accordance with the present invention has manifold application, being particularly well suited for incorporation in instrumentation systems. Proportional control, high torque output, low shaft speed, quick response, high stability, and high resolution are provided by such a cyclic motor when incorporated in a positioning servo system. In addition, economies are effected through the elimination of precision gear trains and tachometer generators, and system reliability is thus enhanced through the elimination of these elements. There may be applications for the cyclic motor with only one driving instrumentality which is either desirable or adequate.

I claim:

1. In a cyclic motor, the combination comprising an oscillatable drive member, electromagnetic means arranged to oscillate said drive member and having an oscillatory winding including two separate windings, a rotatable driven member, electromagnetic clutch means operatively interposed between said drive and driven members and including a clutch winding arranged on one of said members and a clutch plate fast to the other of said members, means arranged to provide a first alternating current the opposite polar alternations of which severally determine independent inputs to said separate windings, and means arranged to provide a second alternating current one polar type of alternation of which only determines input to said clutch winding, one of said alternating currents being fixed and the other variable and the two having the same frequency and being phase-displaced from each other.

2. In a cyclic motor, the combination comprising an oscillatable drive member, electromagnetic means arranged to oscillate said drive member and having an oscillatory winding including two separate windings, means arranged to yieldingly oppose the movement of said drive member to provide sinusoidal oscillation thereof, a rotatable driven member, electromagnetic clutch means including a clutch winding arranged on said drive member and a clutch plate fast to said driven member, means arranged to provide a variable alternating current the positive alternation thereof determining input to one of said two separate windings and the negative alternation determining input to the other of said two separate windings, and means arranged to rectify a fixed alternating current having the same frequency as the variable one to provide a pulsing direct current input to said clutch winding, the two alternating currents being about 90 degrees out of phase from each other, whereby the maximum torque output, deliverable to an external load before slipping of the clutch occurs, will tend to remain constant and the output speed of the driven member will vary in correspondence to the variation in amplitude of the oscillating member.

3. In a cyclic motor, the combination comprising an oscillatable drive member, electromagnetic means arranged to oscillate said drive member and having an oscillatory winding including two separate windings, means arranged to yieldingly oppose the movement of said drive member to provide sinusoidal oscillation thereof, a rotatable driven member, electromagnetic clutch means including a clutch winding arranged on said drive member and a clutch plate fast to said driven member, means arranged to provide a fixed alternating current the positive alternation thereof determining input to one of said two separate windings and the negative alternation determining input to the other of said two separate windings, and means arranged to rectify a variable alternating current having the same frequency as the variable one to provide a pulsing direct current input to said clutch winding, the two alternating currents being about 90 degrees out of phase from each other, whereby the output speed of the driven member will tend to remain constant due to the constant amplitude of the oscillating drive member and the maximum torque output, deliverable to an external load before slipping of the clutch occurs, will vary with the strength of the clutch current.

4. A cyclic motor, comprising a rotatable driven member, first and second drive assemblies for said driven member and including first and second oscillatable drive members, first and second electromagnetic means arranged to oscillate said drive members severally and each having an oscillatory winding and first and second electromagnetic clutch means operatively interposed severally between said drive members and said driven member and each including a clutch winding and a clutch plate, means arranged to provide cyclically excitation current input for said oscillatory windings, means arranged to provide cyclically excitation current input for said clutch windings, said current inputs being phase-displaced from each other within each assembly and the respective drives of said driven member by said assemblies being 180 degrees out of phase with each other.

5. In a cyclic motor, the combination comprising a driven shaft, a clutch body in the form of an arm projecting radially outwardly from the axis of said shaft, spring means supporting the inner end of said arm and arranged to permit with yielding opposition the oscillation of said arm in a circumferential direction with respect to said axis, means for oscillating said arm including stationary electromagnetic means arranged adjacent the outer end of said arm and a magnetically permeable member arranged on the outer end of said arm, a clutch coil arranged on said arm intermediate the ends thereof, and a magnetically permeable disk shaped clutch plate fast to said shaft and arranged in operative position opposite said clutch coil.

6. A cyclic motor, comprising a driven shaft, first and second drive assemblies therefor, each of said assemblies including a clutch body oscillatable in a circumferential direction with respect to the axis of said shaft, means for oscillating said clutch body including stationary electromagnetic means and a magnetically permeable member arranged on said clutch body and movably responsive to said electromagnetic means, spring means arranged to oppose oscillatory movement of said clutch body, a clutch coil arranged on said clutch body and a magnetically permeable clutch plate fast to said shaft and responsive to the magnetomotive force of said clutch coil, and means arranged to excite electrically and cyclically said electromagnetic means and clutch coil of each of said assemblies with substantially 90 degree phase displacement, said last mentioned means being further arranged to produce driving motions of said assemblies in the same circumferential direction which are 180 degrees out of phase with each other, whereby power is applied to said driven shaft essentially continuously during the whole cycle of the input power applied to the motor.

7. A cyclic motor, comprising a driven shaft, first and second drive assemblies therefor, each of said assemblies including a clutch body in the form of an arm projecting radially outwardly from the axis of said shaft, a spring hinge supporting the inner end of said arm and arranged to permit with yielding opposition the oscillation of said arm in a circumferential direction with respect to said axis, means for oscillating said arm including stationary electromagnetic means arranged adjacent the outer end of said arm and a magnetically permeable member arranged on the outer end of said arm, a clutch coil arranged on said arm intermediate the ends thereof and a magnetically permeable disk shaped clutch plate fast to said shaft and arranged in operative position opposite said clutch coil, means arranged to excite electrically and cyclically said electromagnetic means and clutch coil of each of said assemblies with substantially 90 degree phase displacement, said last mentioned means being further arranged to produce driving motions of said assemblies in the same circumferential direction which are 180 degrees out of phase with each other, whereby power is applied to said driven shaft essentially continuously during the whole cycle of the input power applied to the motor.

8. A cyclic motor, comprising a driven shaft, first and second drive assemblies therefor, each of said assemblies including a clutch body mounted for oscillatory movement about the axis of said shaft, means for oscillating said clutch body including stationary electromagnetic means and a magnetically permeable arm extending radially outwardly from said clutch body and movably responsive to the magnetomotive force of said electromagnetic means, spring means arranged to oppose yieldingly the oscillation of said arm, a clutch coil arranged on said clutch body and a magnetically permeable clutch plate fast to said shaft and arranged in operative position opposite said clutch coil, means arranged to excite electrically and cyclically said electromagnetic means and clutch coil of each of said assemblies with substantially 90 degree phase displacement, said last mentioned means being further arranged to produce driving motions of said assemblies in the same circumferential direction which are 180 degrees out of phase with each other, whereby power is applied to said driven shaft essentially continuously during the whole cycle of the input power applied to the motor.

9. In a cyclic motor, the combination comprising an oscillatable drive member, electromagnetic means arranged to oscillate said drive member and having an oscillatory winding including two separate windings, means arranged to yieldingly oppose the movement of said drive member to provide sinusoidal oscillation thereof, a rotatable driven member, electromagnetic clutch means including a clutch winding arranged on said drive member and a clutch plate fast to said driven member, means arranged to provide an alternating current the positive alternation thereof determining input to one of said two separate windings and the negative alternation determining input to the other of said two separate windings, and means arranged to rectify another alternating current having the same frequency as the first mentioned one to provide a pulsing direct current input to said clutch winding, one of said alternating currents being variable and the other being fixed and being about 90° out of phase from each other.

References Cited in the file of this patent

UNITED STATES PATENTS

| | | |
|---|---|---|
| 1,832,474 | Bludworth | Nov. 17, 1931 |
| 2,548,731 | Lehde | Apr. 10, 1951 |
| 2,585,317 | Holmquist | Feb. 12, 1952 |

FOREIGN PATENTS

| | | |
|---|---|---|
| 503,916 | Great Britain | Apr. 12, 1939 |